US005502808A

United States Patent [19]

Goddard et al.

[11] Patent Number: 5,502,808

[45] Date of Patent: Mar. 26, 1996

[54] VIDEO GRAPHICS DISPLAY SYSTEM WITH ADAPTER FOR DISPLAY MANAGEMENT BASED UPON PLURAL MEMORY SOURCES

[75] Inventors: Marc Goddard, Vence; Louis Tannyeres, St. Laurent-du-Var, both of France

[73] Assignee: Texas Instruments Incorporated, Dallas, Tex.

[21] Appl. No.: 320,791

[22] Filed: Oct. 7, 1994

Related U.S. Application Data

[63] Continuation of Ser. No. 919,691, Jul. 24, 1992, abandoned.

[30] Foreign Application Priority Data

Jul. 24, 1991 [EP] European Pat. Off. .............. 91402072

[51] Int. Cl.[6] ........................ G06F 15/00

[52] U.S. Cl. ........................ 395/162; 395/164; 345/185

[58] Field of Search ........................ 395/162–166, 395/425, 157; 345/132, 185, 201, 203, 204, 214, 189

[56] References Cited

U.S. PATENT DOCUMENTS

| | | | |
|---|---|---|---|
| 4,752,893 | 6/1988 | Guttap et al. | 395/166 |
| 4,916,301 | 4/1990 | Mansfield et al. | 395/162 |
| 4,958,378 | 9/1990 | Bell | 340/721 |
| 5,119,494 | 6/1992 | Garman | 364/DIG. 1 |
| 5,201,037 | 4/1993 | Kohiyama et al. | 395/164 |
| 5,280,579 | 1/1994 | Nye | 395/162 |

OTHER PUBLICATIONS

Inmos "XGA Software Programmer's Guide" Sep. 1991 pp. 1 to 18, section under coprocessor function.

*Primary Examiner*—Mark R. Powell
*Assistant Examiner*—Kee M. Tung
*Attorney, Agent, or Firm*—William E. Hiller; Richard L. Donaldson

[57] ABSTRACT

Video graphics display system having a display adapter connected between a host processor (2) and a display unit (6). The display adapter includes a video memory (4) which has first and second memory parts (3) and (8). A graphics processor (1) is connected between the host processor and the first memory part (3) of the video memory (4) which is operably connected to the display unit. The second memory part (8) of the video memory (4) is connected to a logic based hardware sub-system (7), the logic based hardware sub-system being further connected to the host processor. The host processor effectively provides software and hardware compatible applications associated with the graphics processor and the logic based hardware sub-system for implementation as display data stored in the first and second memory parts of the video memory. The display unit may provide a display based upon the memory content of either the first or the second memory part of the video memory, or a combination of both memory parts. A merging device (1*a*) is coupled to the first and second memory parts of the video memory for transferring and/or copying image data from the second memory part to the first memory part such that combined memory images may be provided on the display unit as controlled by the graphics processor. The display adapter enables the generation of a multi-window display on the display unit provided by the simultaneous execution of higher-level graphics processor tasks and low level logic based hardware sub-system tasks.

12 Claims, 2 Drawing Sheets

VIDEO GRAPHICS DISPLAY SYSTEM WITH ADAPTER FOR DISPLAY MANAGEMENT BASED UPON PLURAL MEMORY SOURCES

This application is a Continuation of application Ser. No. 07/919,691, filed Jul. 24, 1992, now abandoned.

The present invention relates to a display adapter. Display adapters are used intermediate data to be displayed and the display itself.

Adapters may be used in all areas of video displays used in computing applications such as personal computers, workstations, graphic terminals, printers, etc. . .

More particularly, an adapter is connected for example between a host processor and a display unit of a personal computer or of another computerized tool in order to manage the display unit in accordance with control signals from the host processor.

BACKGROUND OF THE INVENTION

Currently, display systems use either non-processor based display adapters such as VGA (Video Graphics Arrays) which contain only low-level logic functions and registers and require that the host processor application software or operating system environment perform essentially all of the display generation and manipulation of graphics processor based adaptors such as TIGA (Texas Instruments General Architecture) based boards which interface via a high-level language or command list system. Further details of arrangements of the latter type are to be found in "Texas Instruments Graphics Architecture User's Guide", 1989; "TMS34010 User's Guide", August 1988; and "TIGA340 Interface" all of which documents are currently available to the public from Texas Instruments Incorporated. Reference may also be made to U.S. Pat. No. 4,752,893.

In the past, and indeed until fairly recently, only the 'dumb' register based display adapters were available. Although some firmware was available to interface these adapters via software calls (the BIOS extensions), such firmware was too slow and cumbersome to be used for advanced high performance applications. This limitation resulted in most application programs accessing directly to the registers and frame buffer of the display hardware.

Upon the advent of higher performance hardware, either at the host processor (CPU) level or at the display adapter level it became possible to rethink the standard display interface, and higher level display environments such as Microsoft Windows® started to appear. This was further encouraged by the need for effective multitasking where several application programs need to interface to the user at the same time but with total independence from each other.

Unfortunately, to fully take advantage of these display environments application programs had to be written especially for them—or at least an interface 'driver' be generated which performed the link. In addition, the old application was used to having the entire machine, including the display adapter all to itself; something which is, of course, not possible in a multitasking environment.

Existing application software was therefore a priori incompatible with the new graphics environment trends.

Some compromise was offered by emulating the hardware model of the old logic adapter through a combination of software and the existing hardware. This, although providing a small consolation was not entirely satisfactory since the poor performance of such a system, again using Microsoft Windows as an example, limits its use to text mode displays only. The more useful graphics modes are not displayable in a window and the user must revert to full screen single task operation. Any software using EGA (Enhanced Graphics Arrays) or VGA graphics is therefore incompatible with multitasking multi-window systems which require that all display accesses are handled by the host processor software. If an 'old application' is executed which requires unique control of the display system, then currently the displays from the multi-window manager are suspended and the 'old-application' takes control of the full screen display thereby removing the advantages of a multi-window user environment.

An aim of the invention is to overcome these drawbacks.

SUMMARY OF THE INVENTION

Accordingly the invention in one aspect thereof relates to a display adapter connected between a host processor and a display unit of a computerized tool, wherein a graphics processor is connected between the host processor and a first part of a memory associated with the display unit and a logic based hardware sub-system is connected between said host processor and a second part of said memory and comprising means for deriving displays from the first part and/or the second part of the memory.

A display system including a display adapter in accordance with the present invention may use both a low-level hardware register, based logic sub-system and also a graphics processor. This allows the generation of a multi-window display wherein both high level (GSP for example) and low level (VGA for example) applications can be executed.

The invention also permits such applications to be run simultaneously and further permits a merged display of data from such applications.

The system operates for example by allowing 'new' applications and display environments to interface, via their special driver routines for example, to the on-board graphics processor. The latter receives high level commands and performs the graphics execution. Because the logic-based hardware subsystem is totally independent of the graphics processor, it is available for use by the 'old' register/logic based applications. By allocating memory in separate parts to firstly the high level graphics processor based tasks and secondly to the low level hardware based tasks both can execute concurrently in the same system and can even have totally different memory uses, display formats, register values, and so on. Forming the eventual display may then be performed by software. This may be executed by a subroutine of the graphics processor, and may, in one example, be a transfer for example a block copy from the low level memory part into some locations of the high level memory part of video memory associated with the display.

The display may then be derived form the first memory part only. Alternatively the second or both parts may be used.

One advantage of this system appears immediately in that the data transfered can be significantly processed during the transfer allowing many different storage formats and techniques for the 'old' applications, converted to 'real' displayable format by graphics processor software. In the TIGA/VGA example, this is particularly useful to allow conversion from VGA planar organisation to the packed pixel organisation of TIGA.

The hardware logic sub-system associated therewith a number of internal registers programmed by the application program. All of these register values may also stored in the common memory along side the display information greatly to facilitate task switching between 'old' applications by simply switching the local area of memory allocated to each task and allow several image areas in memory to exist at the same time allowing multiple hardware VGA windows on the same display. Base address registers in the VGA sub-system control the area of memory to be used by each task. The multi-tasking operating system would be responsible for maintaining these registers in cooperation with the software running on the associated graphics processor.

The advantage of such an arrangement is that existing software can be executed by the user in a multi-window environment without losing the multi-window display. In addition, several hardware compatible applications can be viewed at the same time without falling back to a full-screen display for each task. Software in the host processor or associated graphics processor can decide how much, if any, of the hardware generated display is copied into the relevant window and where such a window appears on the final display. The data itself can also be manipulated in a variety of ways during the copy from the hardware image zone to the multi-window display zone. Such manipulation would take care of differing plane depths, text size, palettes, etc . . . which would otherwise cause incompatibility between the two otherwise independent displays.

The hardware based sub-system is not limited to VGA compatibility but can be extended to cover other hardware based display standards such as 8514A, Hercules, and basically any situation which requires the concurrent execution of 'old' application software which expects to have entire ownership of the display system and 'new' applications designed for multitasking environments which do not have as 'exclusive' tastes.

DESCRIPTION OF THE DRAWINGS

The invention will be better understood with reference to the drawings, in which.

DESCRIPTION OF PREFERRED EMBODIMENT

Figure 1:
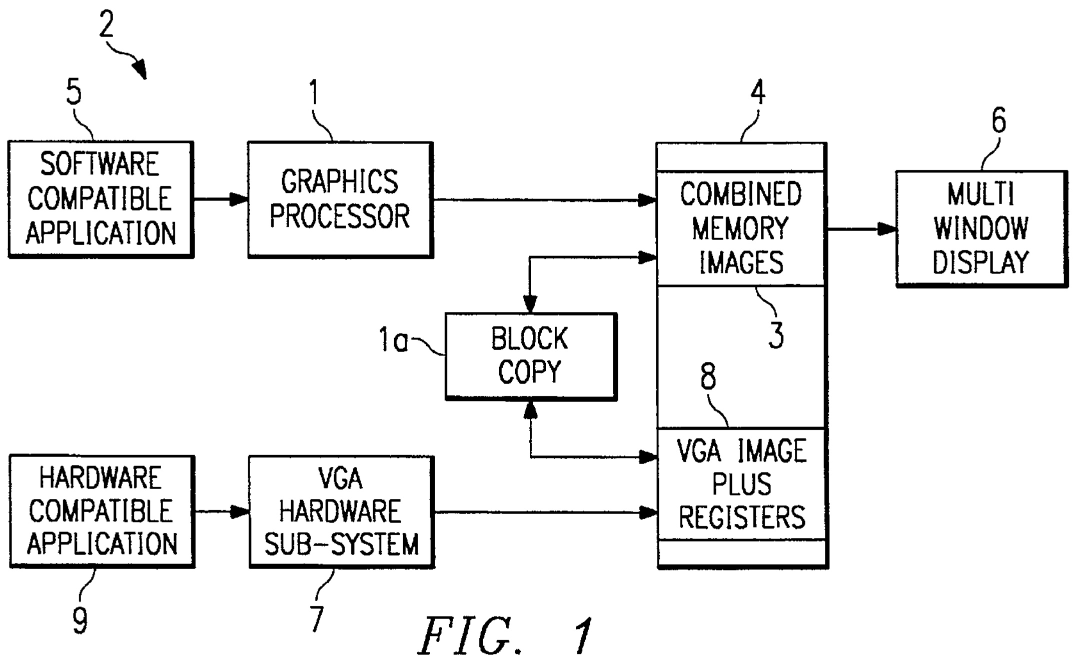
FIG. 1 is a block diagram of an embodiment of a display adapter according to the invention.

As shown in FIG. 1, a display adapter according to the invention comprises a graphics processor 1 such as a TMS34010 connected between a host processor 2 of a computerized tool and a first part 3 of a video memory 4.

More specifically, the graphics processor is associated with at least one software compatible application 5 running on the host processor, and the first part 3 of the video memory 4 is associated with a display unit 6, as for example a multi window display unit.

The display adapter according to the invention also comprises a logic based hardware sub-system 7, as for example a VGA hardware sub-system, connected between the host processor 2 and a second part 8 of the video memory 4.

More specifically the hardware sub-system 7 is associated with at least one hardware compatible application 9 running on the host processor 2 and the second part 8 of the video memory 4 comprises VGA image and registers.

Merging means la are provided between the second part 8 and the first part 3 of the memory in order to transfer in the first part, the image data stored in the second part so that combined memory images are stored in this first part of the memory and depicted on the display unit under the control of the graphics processor 1.

In one case, these merging means comprises means for copying data from the low level memory part 8 into some location of the high level memory part 3.

As explained before this would typically be executed by a subroutine of the graphics processor 1.

As explained before also the adapter then uses a low level hardware logic based sub-system and also a graphics processor for allowing the generation of a multi-window display wherein both high level and low level applications can execute simultaneously.

By allocating separate memory parts to the high level graphics processor based tasks and to the low level hardware logic based sub-system, both can execute concurrently in the same overall system.

Figure 2:
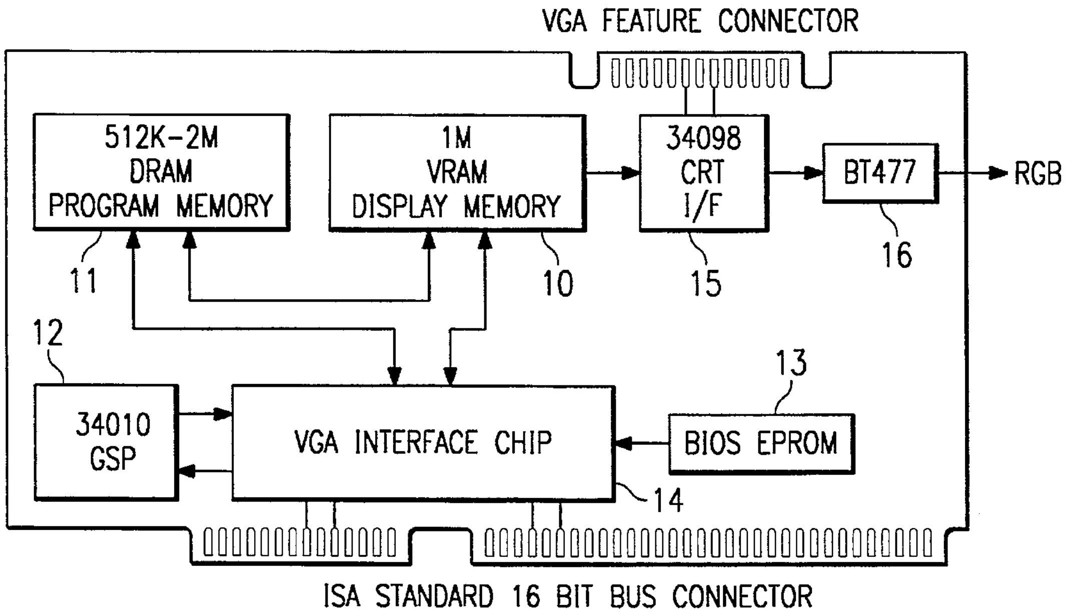
FIG. 2 is a block diagram of a card comprising an adapter according to the invention.

The card shown in FIG. 2 is a next generation, ISA compatible display adapter for personal computers. Based on a hybrid combination of a TMS34010 Graphics System Processor (GSP) and a custom designed hardware support chip, it is compatible with existing register based display adapter standards such as Video Graphics Array (VGA) and also software based display standards such as Texas Instruments Graphics Architecture (TIGA).

Features

IBM XT/AT compatible graphics adapter card

TMS34010 graphics system processor based

Short AT format

100% Hardware VGA register compatible

100% VGA BIOS compatible

VGA pass-through option

TIGA graphics manager and communication driver available on board

Supports 640 by 480, 800 by 600 and 1024 by 768 resolutions.

Compatible with all standard IBM PS/2 and multisync monitors

Compatible with fixed frequency monitors in VGA and TIGA modes

Interlaced and non-interlaced output in 1024×768 mode

Modular memory design with 1M VRAM and from 512K to 2M DRAM

Memory Size

The basic card is populated with 1 Mbyte of VRAM 10 and 512 Kbytes of DRAM 11. This is adequate memory for all display modes up to and including 1024 by 768 in 256 colours. It also provides enough memory for simultaneous operation in both TIGA and VGA modes with distinct frame buffers and also provides working storage and memory space for downloaded extensions to TIGA such as when using MS-Windows. For operational modes which require even greater amounts of memory, such as X windows, for example, a factory expansion option is available to increase the amount of DRAM to 2 Mbytes. The VRAM size remains 1 Mbyte and display resolutions are the same.

Hardware Description

General

As explained before the graphics adapter according to the invention is based on the Texas Instruments TMS34010 Graphics System Processor (GSP12). The latter provides all the intelligence and horsepower for high speed advanced graphics manipulation, whilst an associated ASIC device working in conjunction with the GSP provides the registers and hard-wired logic functions necessary to achieve full hardware IBM VGA compatibility.

PC Bus Interface

The PC bus interface is compatible with both 8 and 16 bit ISA standard system buses. In addition it will automatically self configure to the relevant 8 or 16 bit mode depending upon the host used.

Bus operation is specified within the range 4.77 MHz up to 10 MHz.

PC Memory and I/O Mapping

Figure 3:
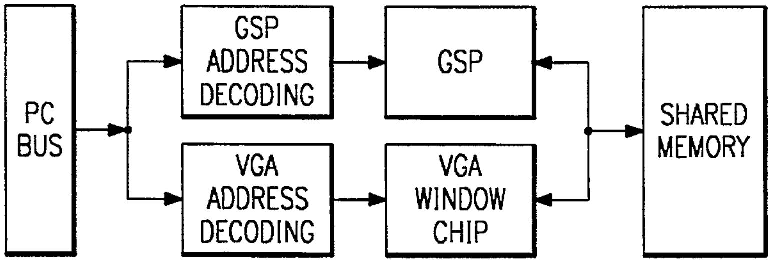
FIG. 3 is a block diagram illustrating the GSP and VGA addressing.

The present invention allows the card to appear to the PC hardware as essentially two independent adapters on the same physical card. This is particularly so for the address decoding and mapping into PC memory and I/O space as shown in FIG. 3.

The card permits the mapping of three essentially independent functions into the host systems memory and I/O space: VGA display adapter registers and frame buffers, VGA BIOS memory and the Graphics

Processor Interface Registers.

The locations of the first two of these functions are fixed and compatible with industry standard VGA practice as shown in the table below.

| VGA standard function | I/O address | Memory address |
|---|---|---|
| BIOS firmware routines | | C000:0000–C000:7FEF |
| Fixed registers | 3CO-3CF | |
| Monochrome registers | 3BO-3BF | |
| Colour registers | 3DO-3DF | |
| Monochrome text buffer | | B000:0000-B000:7FFF |
| Colour text buffer | | B800:0000-B800:7FFF |
| Colour graphics buffer | | A000:0000-A000:FFFF |
| Extended graphics buffer | | A000:0000-B000:FFFF |

Memory and I/O locations of standard VGA display functions

The third function is based upon the TMS34010 Graphics System Processor host interface registers used for high level command communication and software interfaces such as TIGA. So as to interfere as little as possible with the standard memory and I/O use of a typical PC, this interface can be either memory mapped to an unused part of the VGA BIOS memory space or I/O mapped to one of two user selectable options as shown in the table below. Thus a separate or direct input or output of display data is provided, for example by means of memory mapping as described.

| GSP host register | | Memory mapped option | I/O mapped option 1 | I/O mapped option 2 |
|---|---|---|---|---|
| HSTDATA | msb | C000:7FF8 | 0294 | 0284 |
| | lsb | C000:7FF9 | 0295 | 0285 |
| HSTCTL | msb | C000:7FFA | 0296 | 0286 |
| | lsb | C000:7FFB | 0297 | 0287 |
| HSTADRL | msb | C000:7FFC | 0290 | 0280 |
| | lsb | C000:7FFD | 0291 | 0281 |
| HSTADHR | msb | C000:7FFE | 0292 | 0282 |
| | lsb | C000:7FFF | 0293 | 0283 |

Optional GSP host register interface mapping

Additionally, the on board BIOS PROMS may be disabled as a user option to allow for circumstances such as the use of the card in a PC which already contains a traditional VGA adapter. This is known as 'pass-through' mode and is described below.

For operational modes associated with VGA compatibility the display adapter is accessed in an identical manner to standard VGA practice.

BIOS Extension

A pair of on-board EPROMS's 13 contain the system BIOS extension program for compatible operation. These will permit maximum speed 16 bit operation in applicable machines and will also allow 8 bit operation in machines with this bus size.

The EPROM's also contain the GSP support program necessary for full board operation. This is transferred from the BIOS EPROM to GSP RAM by the PC boot procedure.

The EPROM's each contain a maximum of 32 k bytes.

Graphics System Processor (12)

The display adapter uses the Texas Instruments TMS34010 Graphics System Processor (GSP) for high performance, flexibility and ease of customisation. This is a 32 specialised graphics microprocessor with high speed RISC type pipelined architecture capable of execution speeds up to 7,5 million instructions per second. The instruction set is both general purpose allowing full development and execution of software written in high level languages such as C, and specialised allowing software efficiency and performance when manipulating graphics data.

VGA Interface Chip (14)

The hardware compatibility with VGA standard is obtained through the dedicated VGA interface chip. It will be noted that this device does not contain a fully independent VGA sub-system, but rather, provides those hardware features required for full 100% 'register level' VGA. These features include control registers, real-time logic functions and specific address and data mapping as will be described. In accordance with a feature of the present invention full VGA functionality is provided by the GSP.

The VGA interface device also provides the address and data decoding for both the PC host bus and the local memory system bus.

VGA Pass-Through Option

In addition to supplying all the necessary elements for full VGA compatible operation, the card is also capable of operating with another VGA card whilst still needing only one monitor. In this mode, called VGA pass-through mode, the card generates the TIGA compatible display portion and the other VGA card the VGA display portion. The latter is routed from the pure VGA card via a pass-through cable to the feature connector of the card whence it is fed the local palette input and then to the single monitor output. In this mode, logic on the card ensures that its local palette contains a copy of the original VGA palette and that the on-board BIOS PROMS and VGA input registers are disabled.

Local Memory

Local memory is the term used to refer to memory contained on the display adapter which is used by the GSP and/or VGA support device but which is not accessible directly from the PC address and data buses or PC application software.

The display adapter is intrinsically modular in terms of memory size. Theoretically any size of memory could be used depending upon the display resolution and number of colours required and the amount of local software. The memory is composed of a mixture of VRAM which is used for display purposes and DRAM which is used for non-display purposes such as program, character generators etcetera. The baseline system contains 1 M byte of VRAM and 512K of DRAM. The extended system contains 1 M byte of VRAM and 2M bytes of DRAM.

Colour Palette (16)

The display adapter contains an industry standard VGA compatible palette with a maximum pixel frequency of 65MHz connected at the output of a TI34098 CRT control chip 15. This allows display resolutions up to 1024 by 768 in 256 colours at a frame frequency of 60Hz. The electrical characteristics and drive capability of the monitor output are compatible with standard fixed mode and multi-sync type monitors.

The colour of the overscan border is controlled through software via programmable on-board registers. The width and height of the border can be programmed independently from each other and other paramaters.

The polarity of both the horizontal and vertical synchronisation signals set to the attached monitor can be individually controlled by GSP software.

The logical states of pins 9, 10 and 11 of the monitor connector can be determined by GSP software in order to allow for automatic monitor type detection where applicable.

The pixel output frequency can be selected by GSP software between at least 4 non-harmonically related frequencies which all lie in the range 5–65 MHz. In addition, some sub-harmonics of these four frequencies are also available and selectable by GSP software. Under normal circumstances the board will be equipped with frequencies allowing compatibility with standard VGA operating modes and monitors.

Due to the unique architecture of the card, the actual display function is entirely independent of the VGA subsystem and is entirely under GSP software control. This gives a very important increase in system flexibility since display output can be customised to individual user needs such as flat panel displays or even fixed frequency monitors even through several display resolutions are used.

Logic Based Hardware Subsystem (14)

The logic based hardware subsystem is a single device containing a hardware VGA subsystem designed to operate in conjunction with a TMS34010 Graphics System Processor (GSP).

The logic based hardware subsystem allows the system designer to create a single board level system for the PC environment with both high performance graphics compatibility through TIGA and backward hardware compatibility at the VGA register and BIOS levels. The logic based hardware subsystem provides those essential hardware elements of the VGA standard not already provided by the GSP system such as I/O registers and real-time logic functions such as rotate, mask, etcetera.

In addition, and most important, because the logic based hardware subsystem is essentially providing autonomous VGA hardware support to the TMS34010, both systems can operate simultaneously and independently from each other, using either separate or shared memory areas in the common local memory. This enables free mixing of 'hardware' generated VGA displays with 'software' generated displays from another environment such as a windowing environment program running under TIGA. Because the VGA 'window' is hardware generated, no performance trade-off due to emulation need be tolerated in any mode. Furthermore, because of the logic based hardware subsystem's essential dissociation of PC side accesses to the VGA hardware model and the display of the resultant memory areas, any host machine capable of multi-tasking in virtual address spaces can have multiple active hardware VGA windows on the same physical display at the same time.

For optimum integration and with a view to reducing the total number of devices in the final TIGA/VGA system, the logic based hardware subsystem chip also contains the logic interfaces between the PC expansion bus and the GSP and between the GSP and the shared memory system.

Figure 4:
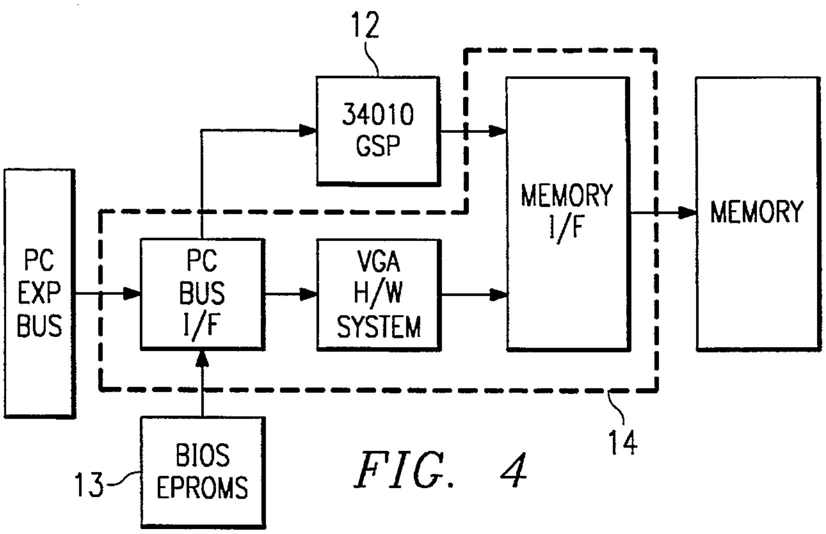
FIG. 4 is a block diagram illustrating the functions integrated in a logic based hardware subsystem.

The functions contained in the logic based hardware subsystem 14 are shown in FIG. 4.

Figure 5:
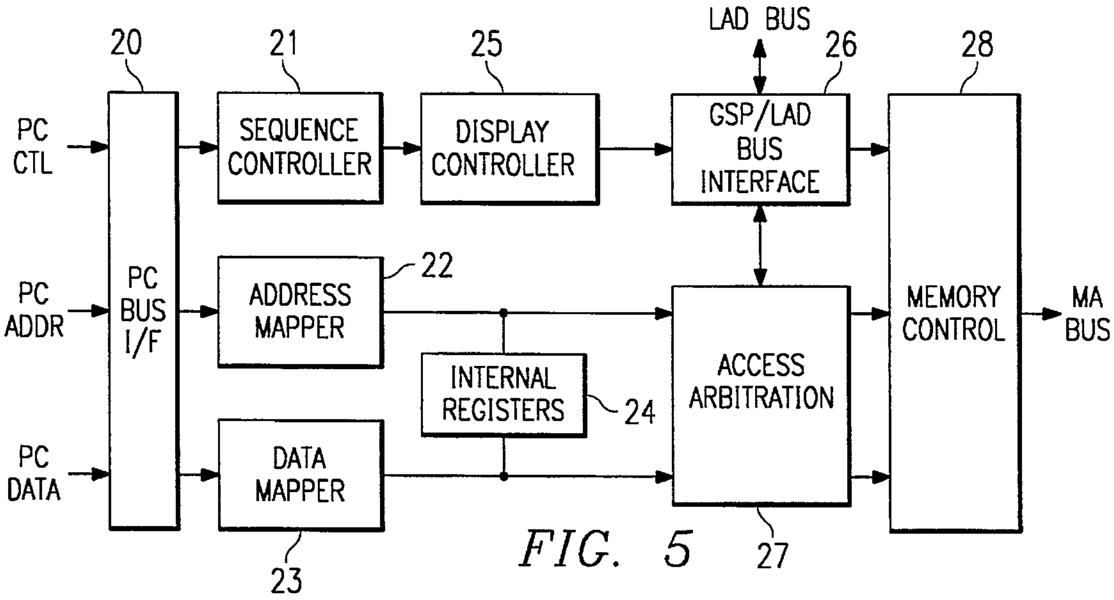
FIG. 5 is a block diagram illustrating the logic based hardware subsystem internal architecture.

The block diagram of the internal architecture of the logic based hardware subsystem appears in FIG. 5.

This logic based hardware subsystem comprises the following elements:

a PC bus interface 20 a Sequence controller 21 an Address mapper 22 a Data mapper 23

Internal registers 24 a Display Controller 25 a GSP/LAD bus interface 26 an Arbitration controller 27 a Memory controller 28

The PC bus interface 20 receives as inputs the PC control, address and DATA signals and provides corresponding signals to the sequence controller 21, the address mapper 22 and the DATA mapper 23 respectively.

The output of the sequence controller 21 is connected to the input of the display controller 25 whose output is connected to an input of the GSP/LAD interface 26. Another input of this interface 26 is connected to the LAD bus and an output of this interface 26 is connected to an input of the memory controller 28.

The output of the address mapper 22 is connected to an input of the internal registers 24 and to an input of the access arbitration controller 27. Another input of this controller 27 is connected to an output of the GSP/LAD BUS interface 26 and an output of the arbitration controller is connected to an input of the memory controller 28.

The output of the data mapper 23 is connected to another input of the internal registers 24 and to another input of the access arbitration controller 27. Another output of this controller 27 is connected to the memory controller 28.

The output of this memory controller 28 is connected to the corresponding second part of the video memory.

As explained before this sub-system provides autonomous VGA hardware support to the TMS34010.

We claim:

1. A display adapter for connection between a host processor and a display unit of a data processing apparatus to provide management of the display unit in response to control signals from the host processor, said display adapter comprising:

a graphics processor adapted to be connected to the host processor;

a video memory having at least first and second dedicated memory parts, the first memory part of said video memory being adapted to be connected to the display unit;

said graphics processor being responsive to a software application and being connected to the first memory part for providing display data thereto;

a logic based hardware sub-system adapted to be connected to the host processor;

said logic based hardware sub-system being responsive to a hardware application and being connected to the second memory part for providing display data thereto; and means operably associated with said first and second memory parts for deriving graphics data to provide displays from the first and/or the second memory parts of said video memory for transmission to the display unit, said means for deriving graphics data comprising means for transferring data stored in the second memory part to the first memory part such that data originating from the second memory part is storable with data stored in the first memory part as combined memory data in the first memory part for application to the display unit under the control of said graphics processor.

2. A display adapter as set forth in claim 1, wherein said data transferring means further comprises means for merging in the first memory part of said video memory, the data stored in the first memory part of said video memory and in the second memory part of said video memory.

3. A display adapter as set forth in claim 2, wherein said data merging means comprises means for copying data from the second memory part of said video memory into the first memory part of said video memory.

4. A display adapter as set forth in claim 3, wherein said data copying means is responsive to a subroutine of said graphics processor for copying data from the second memory part of said video memory into the first memory part of said video memory.

5. A video graphics display system comprising:

a host processor;

a display unit; and a display adapter interposed between said host processor and said display unit and respectively connected to the output of said host processor and the input of said display unit to provide management of said display unit in response to control signals from said host processor, said display adapter including a graphics processor having an input and an output, the input of said graphics processor being connected to said host processor, and said graphics processor being responsive to a software application in operation in said host processor for generating display data at the output of said graphics processor, a video memory having at least first and second dedicated memory parts, the first memory part of said video memory being connected to the output of said graphics processor, said video memory having an output connected to the input of said display unit, a logic based hardware sub-system having an input and an output, the input of said logic based hardware sub-system being connected to said host processor, said logic based hardware subsystem being responsive to a hardware application for generating display data at the output of said logic based hardware sub-system and having its output connected to the second memory part of said video memory, and means operably associated with said first and second memory parts for deriving graphics data to provide displays from the first and/or the second memory parts of said video memory for transmission to said display unit, said means for deriving graphics data comprising means for transferring data stored in the second memory part to the first memory part such that data originating from the second memory part is storable with data stored in the first memory part as combined memory data in the first memory part for application to said display unit under the control of said graphics processor.

6. A video graphics display system as set forth in claim 5, wherein said data transferring means further comprises means for merging in the first memory part of said video memory, the data stored in the first memory part of said video memory and in the second memory part of said video memory.

7. A video graphics display system as set forth in claim 6, wherein said data merging means comprises means for copying data from the second memory part of said video memory into the first memory part of said video memory.

8. A video graphics display system as set forth in claim 7, wherein said data copying means is responsive to a subroutine of said graphics processor for copying data from the second memory part of said video memory into the first memory part of said video memory.

9. A display adapter for connection between a host processor and a display unit of a data processing apparatus to provide management of the display unit in response to control signals from the host processor, said display adapter comprising:

a graphics processor adapted to be connected to the host processor;

a video memory having at least first and second dedicated memory parts, the first part of said video memory being adapted to be connected to the display unit;

said graphics processor being connected to the first memory part;

a logic based hardware sub-system adapted to be connected to the host processor, said logic based hardware sub-system including a data bus interface having inputs for respectively receiving control, address and data signals from the host processor, a sequence controller, an address mapper, a data mapper, said sequence controller, said address mapper, and said data mapper being respectively connected to said data bus interface for respectively receiving control, address and data signals as provided from the output thereof, a display controller connected to the output of said sequence controller, internal registers connected to the outputs of said address and data mappers, a graphics processor/local address-data bus interface connected to the output of said display controller and having an input adapted to be connected to a local address-data bus, an access arbitration controller connected to the outputs of said address mapper and said data mapper, said access arbitration controller also being connected to an output of said graphics processor/local address-data bus interface and having first and second outputs, and a memory controller connected to the output of said graphics processor/local address-data bus interface and the first and second outputs of said access arbitration controller;

said logic based hardware sub-system being connected to the second memory part; and means operably associated with said first and second memory parts for deriving graphics data to provide displays from the first and/or the second memory parts of said video memory for transmission to the display unit.

10. A display adapter as set forth in claim 9, wherein said logic based hardware sub-system comprises a video graphics array hardware sub-system.

11. A video graphics display system comprising:

a host processor;

a display unit; and a display adapter interposed between said host processor and said display unit and respectively connected to the output of said host processor and the input of said display unit to provide management of said display unit in response to control signals from said host processor, said display adapter including:

a graphics processor connected to said host processor, a video memory having at least first and second dedicated memory parts connected to the output of said graphics processor, said video memory having an output connected to the input of said display unit, a logic based hardware sub-system connected to said host processor and having an output connected to the second memory part of said video memory, said logic based hardware sub-system of said display adapter including a data bus interface having inputs for respectively receiving control, address and data signals from said host processor, a sequence controller, an address mapper, a data mapper, said sequence controller, said address mapper, and said data mapper being respectively connected to said data bus interface for respectively receiving control, address and data signals as provided from the output thereof, a display controller connected to the output of said sequence controller, internal registers connected to the outputs of said address and data mappers, a graphics processor/local address-data bus interface connected to the output of said display controller and having an input adapted to be connected to a local address-data bus, an access arbitration controller connected to the outputs of said address mapper and said data mapper, said access arbitration controller also being connected to an output of said graphics processor/local address-data bus interface and having first and second outputs, and a memory controller connected to the output of said graphics processor/local address-data bus interface and the first and second outputs of said access arbitration controller; and means operably associated with said first and second memory parts for deriving graphics data to provide displays from the first and/or the second memory parts of said video memory for transmission to said display unit.

12. A video graphics display system set forth in claim 11, wherein said logic based hardware sub-system comprises a video graphics array hardware sub-system.

* * * * *